(12) United States Patent
Chiong

(10) Patent No.: US 9,617,387 B2
(45) Date of Patent: *Apr. 11, 2017

(54) SCRUBBING PROCESS FOR POLYARYLENE SULFIDE FORMATION

(71) Applicant: Ticona LLC, Florence, KY (US)

(72) Inventor: Hendrich Alvarez Chiong, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,343

(22) Filed: Sep. 9, 2014

(65) Prior Publication Data

US 2015/0087778 A1 Mar. 26, 2015

Related U.S. Application Data

(60) Provisional application No. 61/882,310, filed on Sep. 25, 2013.

(51) Int. Cl.
  *C08G 75/14* (2006.01)
  *B01J 19/00* (2006.01)
  *B01J 19/18* (2006.01)

(52) U.S. Cl.
  CPC ......... *C08G 75/14* (2013.01); *B01J 19/0046* (2013.01); *B01J 19/18* (2013.01); *B01J 19/1862* (2013.01); *B01J 2208/00176* (2013.01); *B01J 2208/00274* (2013.01); *B01J 2208/00283* (2013.01); *B01J 2208/00539* (2013.01); *B01J 2219/0013* (2013.01); *Y02P 20/582* (2015.11)

(58) Field of Classification Search
  CPC ....................................................... C08G 75/14
  USPC ................... 528/375, 373; 524/726; 422/134
  See application file for complete search history.

(56) References Cited

U.S. PATENT DOCUMENTS

| 3,869,433 A | 3/1975 | Campbell |
| 4,038,259 A | 7/1977 | Campbell et al. |
| 4,038,260 A | 7/1977 | Campbell |
| 4,038,262 A | 7/1977 | Edmonds, Jr. |
| 4,038,263 A | 7/1977 | Edmonds, Jr. et al. |

(Continued)

FOREIGN PATENT DOCUMENTS

| EP | 2 322 485 A1 | 5/2011 |
| JP | H07228699 | 8/1995 |

(Continued)

OTHER PUBLICATIONS

U.S. Appl. No. 14/481,257 claims, Sep. 2014.*

(Continued)

*Primary Examiner* — Duc Truong
(74) *Attorney, Agent, or Firm* — Dority & Manning, P.A.

(57) ABSTRACT

A method and system for formation of a polyarylene sulfide is described. The method includes a first stage in which a complex is formed in a reactor. The complex includes the hydrolysis product of an organic amide solvent and an alkali metal hydrosulfide. The complex formation reaction also forms hydrogen sulfide as a by-product. The method also includes treating a fluid stream that is pulled off of the reactor. The treatment includes scrubbing the fluid stream to recover hydrogen sulfide from the stream and return the hydrogen sulfide to the reactor. The recovery and recycle of the hydrogen sulfide can prevent loss of sulfur from a polyarylene sulfide formation process.

26 Claims, 3 Drawing Sheets

(56) References Cited

U.S. PATENT DOCUMENTS

| | | |
|---|---|---|
| 4,039,518 A | 8/1977 | Campbell |
| 4,056,515 A | 11/1977 | Vidaurri, Jr. |
| 4,060,520 A | 11/1977 | Irvin |
| 4,064,114 A | 12/1977 | Edmonds, Jr. |
| 4,089,847 A | 5/1978 | Edmonds, Jr. et al. |
| 4,096,132 A | 6/1978 | Edmonds, Jr. |
| 4,370,470 A | 1/1983 | Vidaurri et al. |
| 4,393,197 A | 7/1983 | Edmonds, Jr. |
| 4,451,640 A | 5/1984 | Shiiki et al. |
| 4,457,812 A | 7/1984 | Rado |
| 4,495,332 A | 1/1985 | Shiiki et al. |
| 4,501,902 A | 2/1985 | Cleary |
| 4,514,558 A | 4/1985 | Shiiki et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,745,167 A | 5/1988 | Iizuka et al. |
| 4,761,468 A | 8/1988 | Okamoto et al. |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,841,019 A | 6/1989 | Iwasaki et al. |
| 4,931,516 A | 6/1990 | Iizuka et al. |
| 4,976,825 A | 12/1990 | Iwasaki et al. |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,086,163 A | 2/1992 | Scoggins et al. |
| 5,110,902 A | 5/1992 | Scoggins et al. |
| 5,126,430 A | 6/1992 | Senga et al. |
| 5,179,194 A | 1/1993 | Kawakami et al. |
| 5,194,580 A | 3/1993 | Koyama et al. |
| 5,235,032 A | 8/1993 | Geibel et al. |
| 5,241,043 A | 8/1993 | Senga |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,635,587 A | 6/1997 | Koyama et al. |
| 5,688,908 A | 11/1997 | Haubs et al. |
| 5,744,576 A | 4/1998 | Miyahara et al. |
| 5,756,654 A | 5/1998 | Sase et al. |
| 5,777,069 A | 7/1998 | Tsuda et al. |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,898,061 A | 4/1999 | Sase et al. |
| 5,929,203 A | 7/1999 | Ash et al. |
| 6,001,934 A | 12/1999 | Yamanaka et al. |
| 6,201,097 B1 | 3/2001 | Geibel et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,562,900 B2 | 5/2003 | Okamoto et al. |
| 6,600,009 B2 | 7/2003 | Inoue et al. |
| 6,646,105 B2 | 11/2003 | Shirota |
| 6,653,437 B2 | 11/2003 | Hinokimori et al. |
| 6,743,890 B2 | 6/2004 | Bando |
| 6,750,319 B2 | 6/2004 | Koyama |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,426,552 B2 | 4/2013 | Hinokimori et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,680,230 B2 | 3/2014 | Konno et al. |
| 2003/0150804 A1 | 8/2003 | Haubs et al. |
| 2004/0249118 A1 | 12/2004 | Kagoshima et al. |
| 2005/0171332 A1 | 8/2005 | Koyama |
| 2006/0084785 A1 | 4/2006 | Sato et al. |
| 2010/0137531 A1 | 6/2010 | Horiuchi |
| 2010/0163499 A1 | 7/2010 | Odueyungbo |
| 2010/0210813 A1 | 8/2010 | Foder et al. |
| 2010/0228003 A1 | 9/2010 | Hinokimori et al. |
| 2010/0234559 A1 | 9/2010 | Sato et al. |
| 2011/0124825 A1 | 5/2011 | Konno et al. |
| 2011/0178268 A1 | 7/2011 | Suzuki et al. |
| 2011/0319587 A1 | 12/2011 | Hinokimori |
| 2012/0165501 A1 | 6/2012 | Kaiho et al. |
| 2012/0322972 A1 | 12/2012 | Koizumi et al. |
| 2012/0329984 A1 | 12/2012 | Kim et al. |
| 2013/0022808 A1 | 1/2013 | Taniguchi et al. |
| 2013/0065054 A1 | 3/2013 | Ichinose et al. |
| 2013/0068256 A1 | 3/2013 | Kobayashi et al. |
| 2013/0116401 A1 | 5/2013 | Kimura et al. |
| 2013/0253147 A1 | 9/2013 | Ichinose et al. |
| 2014/0128568 A1 | 5/2014 | Hinokimori |
| 2015/0065664 A1 | 3/2015 | Konno et al. |

FOREIGN PATENT DOCUMENTS

| | | |
|---|---|---|
| JP | H07242746 | 9/1995 |
| JP | H07292107 | 11/1995 |
| JP | H07316428 | 12/1995 |
| JP | H07330911 | 12/1995 |
| JP | H0820644 | 1/1996 |
| JP | H0820645 | 1/1996 |
| JP | H08100064 | 4/1996 |
| JP | H08118502 | 5/1996 |
| JP | H08118503 | 5/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |

(56) References Cited

FOREIGN PATENT DOCUMENTS

| | | |
|---|---|---|
| JP | H08283413 | 10/1996 |
| JP | H08319348 | 12/1996 |
| JP | H0967439 | 3/1997 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |
| WO | WO 2013/061561 A1 | 5/2013 |
| WO | WO 2013/0147141 | 10/2013 |

OTHER PUBLICATIONS

U.S. Appl. No. 14/481,310 claims, Sep. 2014.*

International Patent Application No. PCT/US2014/54734; International Search Report and Written Opinion dated Nov. 25, 2014; (7 pages).

International Patent Application No. PCT/US2014/54741; International Search Report and Written Opinion dated Nov. 25, 2014; (7 pages).

International Patent Application No. PCT/US2014/54724; International Search Report and Written Opinion dated Dec. 8, 2015; (6 pages).

International Patent Application No. PCT/US2014/54728; International Search Report and Written Opinion dated Jan. 16, 2015; (11 pages).

International Patent Application No. PCT/US2014/54745; International Search Report and Written Opinion dated Nov. 25, 2014; (7 pages).

International Patent Application No. PCT/US2014/54750; International Search Report and Written Opinion dated Jan. 22, 2014; (11 pages).

* cited by examiner

SCRUBBING PROCESS FOR POLYARYLENE SULFIDE FORMATION

CROSS REFERENCE TO RELATED APPLICATIONS

The present application claims filing benefit of U.S. Provisional Patent application 61/882,310 having a filing date of Sep. 25, 2013, which is incorporated herein by reference in its entirety.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic monomer with an alkali metal sulfide or an alkali metal hydrosulfide in an organic amide solvent.

In most formation processes, a mixture including the organic amide solvent, the alkali metal sulfide or alkali metal hydrosulfide, and water (and often an alkali metal hydroxide as well) are reacted to form a complex prior to the polymerization reaction with the dihaloaromatic monomer. Unfortunately, this reaction requires the presence of water, which is preferably removed prior to the polymerization reaction, and creates as by-product hydrogen sulfide that is formed according to the thermal decomposition equilibrium of the alkali metal sulfide:

$$X_2S + 2H_2O \leftrightarrow 2H_2S + XOH$$

in which X is an alkali metal.

Loss of sulfur from the polymerization process can be quite high during this step, up to about 10% of the added sulfur in some systems. This can have detrimental effects on the product formed. For instance, when the loss of sulfur causes the ratios between other reactants and the sulfur (e.g., the diahaloaromatic monomer to sulfur ratio) to increase excessively, detrimental effects to the process and product can occur such as color changes, undesirable side reactions, malodor, as well as variations in molecular weight, melt viscosity, mechanical properties, and polymer end groups. Moreover, the gaseous hydrogen sulfide by-product can create toxicity in the process waste stream, which can have harmful effects on plant personnel as well as on the external environment and population if not properly treated according to additional, expensive waste processing.

Attempts have been made to address this problem. For instance, estimates of sulfur loss through the complex formation step have been made, with the input levels being adjusted accordingly. Unfortunately, this approach fails to prevent sulfur loss into the waste stream. In other attempts, the waste stream carrying sulfur in the form of hydrogen sulfide is brought into contact with the input reactor stream in an attempt to catch lost sulfur form the waste. In yet another attempt, the mixture being subjected to the complex formation process is subjected to elevated, declining pressure conditions to attain a more consistent and less extensive sulfur loss through the complex formation and dehydration step.

What is needed in the art is a method for prevention of sulfur loss during the formation of sulfur-containing polymers. For instance, methods for treatment of a reaction waste stream so as to capture sulfur from the waste and return the sulfur to the reaction process would be of great benefit.

SUMMARY OF THE INVENTION

A method is disclosed for forming a polyarylene sulfide. For instance, a method can include reacting an organic amide solvent with an alkali metal sulfide in the presence of water to form a complex that includes the hydrolysis product of the organic amide solvent and an alkali metal hydrosulfide. The reaction also produces hydrogen sulfide by-product.

The method also includes scrubbing a stream that contains the hydrogen sulfide by-product with a scrubbing mixture that includes an organic amide solvent and an alkali metal hydroxide. The scrubbing mixture traps the hydrogen sulfide by-product and forms a sulfur-containing mixture. The resulting sulfur-containing mixture can then be fed back into the reactor. The method also includes reacting the complex with a dihaloaromatic monomer to form a polyarylene sulfide prepolymer, and reacting the prepolymer with a dihaloaromatic monomer and a sulfur-containing monomer to form the polyarylene sulfide.

Also disclosed is a system that may be used for carrying out the method. The system can include a reactor within which an organic amide solvent and an alkali metal sulfide can react in the presence of water to form the complex. This reactor can include an outlet for removal of a fluid stream from the reactor. The system can also include a scrubber in fluid communication with the reactor such that the fluid stream from the reactor can flow to the scrubber where it can be scrubbed by a scrubbing mixture that includes an organic amide solvent and an alkali metal hydroxide. In addition, the scrubber can include an outlet that is in fluid communication with the reactor such that the resultant sulfur-containing scrubbing mixture can be transferred from the scrubber to the reactor.

BRIEF DESCRIPTION OF THE FIGURES

The present disclosure may be better understood with reference to the following figures.

DETAILED DESCRIPTION

Figure 1:
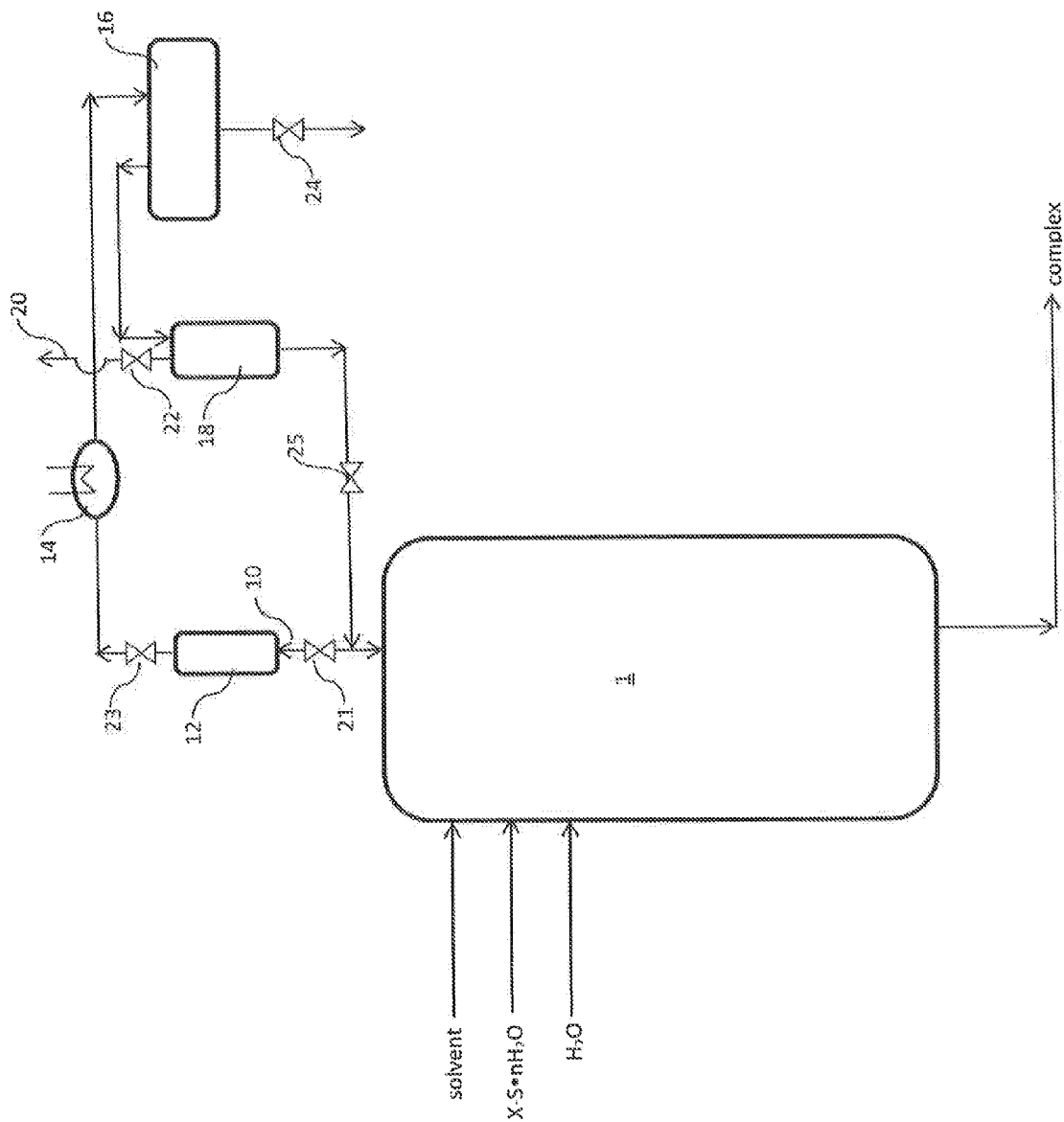
FIG. 1 illustrates a reactor system as described herein.

It is to be understood by one of ordinary skill in the art that the present discussion is a description of exemplary embodiments only, and is not intended as limiting the broader aspects of the present invention.

The present disclosure is generally directed to multi-stage processes for forming a polyarylene sulfide and systems as may be utilized in carrying out the processes. More specifically, the multi-stage process includes a first stage reaction in which a sulfur-containing complex is formed. The sulfur-containing complex includes a hydrolysis product of an organic amide solvent and an alkali metal hydrogen sulfide. Hydrogen sulfide is also formed as a by-product of the sulfur-containing complex formation reaction. This stage also includes a recovery and recycle step that can recover the hydrogen sulfide from a fluid stream that includes the hydrogen sulfide by-product. The recovery process includes utilization of a scrubbing mixture that can capture hydrogen sulfide from the fluid stream and return the hydrogen sulfide to the first stage reaction. Through utilization of the scrubbing mixture, the efficiency of the hydrogen sulfide absorption can be quite high. For instance, about 90% or more, about 95% or more, or about 98% or more of the hydrogen sulfide in the fluid stream can be removed in the scrubber. In one embodiment 100% of the hydrogen sulfide in the fluid stream can be removed from the fluid stream in the scrubber and returned back to the first stage reaction. Beneficially, the scrubbing mixture utilizes reactants of the polymer formation process to capture the hydrogen sulfide. Specifically, the scrubbing mixture includes an organic amide solvent and an alkali metal hydroxide that can be utilized in the polymer formation process following recycle. Accordingly, the recovery and recycle system will add reactants to the polymer formation process and will not add agents that could have a detrimental effect on the process or the polyarylene sulfide formed by the process.

The second stage of the process includes a polymerization reaction in which the sulfur-containing complex reacts with a dihaloaromatic monomer to form a prepolymer. A third stage of the process includes further polymerization of the prepolymer in the presence of additional monomer to form the final product.

In general, a sulfur-containing polymer as may be formed according to the process can be a polyarylene thioether containing repeat units of the formula (I):

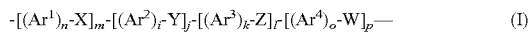

-[(Ar$^1$)$_n$-X]$_m$-[(Ar$^2$)$_i$-Y]$_j$-[(Ar$^3$)$_k$-Z]$_l$-[(Ar$^4$)$_o$-W]$_p$—   (I)

wherein Ar$^1$, Ar$^2$, Ar$^3$, and Ar$^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units Ar$^1$, Ar$^2$, Ar$^3$, and Ar$^4$ may be selectively substituted or unsubstituted. Advantageous arylene systems are phenylene, biphenylene, naphthylene, anthracene and phenanthrene. The polyarylene sulfide can typically include more than about 30 mol %, more than about 50 mol %, or more than about 70 mol % arylene sulfide (-AR-S—) units. In one embodiment the polyarylene sulfide includes at least 85 mol % sulfide linkages attached directly to two aromatic rings. In one embodiment, the polyarylene sulfide formed by the process can be a polyphenylene sulfide, defined herein as containing the phenylene sulfide structure —(C$_6$H$_4$—S)$_n$— (wherein n is an integer of 1 or more) as a component thereof.

In one embodiment, the different stages (the complex formation stage, the prepolymer formation stage and the final polymer formation stage) can take place in different reactors. The utilization of separate reactors for each of the stages can decrease cycle time, as the total cycle time can be equal to that of the slowest stage, rather than the sum of all stages as in a single reactor system. In addition, the utilization of separate reactors can decrease capital costs, as smaller reactors can be utilized than would be necessary for the same size batch in a single reactor system. Moreover, as each reactor need only meet the specifications of the stage being carried out in that reactor, a single, large reactor that meets the most stringent parameters of all stages of the formation process is not necessary, which can further decrease capital costs.

FIG. 1 illustrates one embodiment of a reactor 1 that can be utilized for the first stage of the process during which an organic amide solvent (solvent) and an alkali metal sulfide (X—S.nH$_2$O) can react in the presence of water to form a complex that includes a hydrolysis product of the organic amide solvent and an alkali metal hydrosulfide.

Exemplary organic amide solvents as may be used in forming the complex can include, without limitation, N-methyl-2-pyrrolidone (NMP); N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof.

The alkali metal sulfide can be, for example, lithium sulfide, sodium sulfide, potassium sulfide, rubidium sulfide, cesium sulfide or a mixture thereof. In general, the alkali metal sulfide can be provided to the reactor 1 in the hydrate form, as shown.

An alkali metal sulfide can also be generated in situ within the reactor 1. For instance, a sodium sulfide hydrate can be prepared within the reactor 1 following addition of sodium hydrogen sulfide and sodium hydroxide to the reactor 1. When a combination of alkali metal hydrogen sulfide and alkali metal hydroxide are fed to the reactor 1 to form the alkali metal sulfide, the molar ratio of alkali metal hydroxide to alkali metal hydrogen sulfide can be between about 1.00 and about 1.03. In addition, a small amount of an alkali metal hydroxide can be included in the first reactor 1 to remove or react impurities (e.g., to change such impurities to harmless materials) such as an alkali metal polysulfide or an alkali metal thiosulfate, which may be present in a very small amount with the alkali metal sulfide.

In one embodiment, the feed to the reactor 1 can include sodium sulfide (Na$_2$S) (which can be in the hydrate form), N-methyl-2-pyrrolidone (NMP) and water. Reaction between the water, sodium sulfide and the NMP can form a complex including sodium methylaminobutyrate (SMAB—a hydrolysis product of NMP) and sodium hydrogen sulfide (NaSH) (SMAB-NaSH) according to the following reaction scheme:

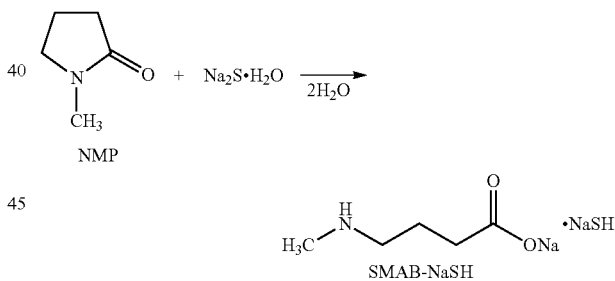

According to one embodiment, a stoichiometric excess of the alkali metal sulfide can be utilized in the first stage reactor, though this is not a requirement of the formation stage. For instance, the molar ratio of organic amide solvent to sulfur in the feed can be from about 2 to about 4, or from about 2.5 to about 3. The molar ratio of water to sulfur in the feed can be from about 2 to about 4, or from about 2.5 to about 3.

During the formation of the complex, a hydrogen sulfide by-product can be formed, as described previously. The complex formation reaction can be carried out at or near atmospheric conditions. To maintain the low pressure reaction conditions, a fluid stream 10 can be removed from the reactor. The main constituents of the fluid stream can include water vapor, hydrogen sulfide by-product, and vaporous organic amide solvent. Water can be removed from reactor 1 so as to dehydrate the complex-containing solution formed in reactor 1. For instance, the molar ratio of water to sulfur-containing complex (or the ratio of oxygen to sulfur) in the product solution of the first reactor 1 can less than about 1.5, or can be between about 0.1 and about 1 such that the complex solution that is utilized in the polymerization process is near-anhydrous.

The stream 10 can be treated to recover hydrogen sulfide from the stream and return the hydrogen sulfide to the reactor 1. The recovery system can include a series of separators for removing components from the fluid stream 10. For instance, the recovery system can include a distillation column 12, a condenser 14, a collector vessel 16, and a scrubber 18.

The scrubber 18 can be charged with a solution that can interact with the hydrogen sulfide of the fluid stream 10 to capture the hydrogen sulfide from the stream and form a sulfur-containing scrubber mixture that can then be returned to the reactor 1, as shown. More specifically, the solution charged to the scrubber 18 can include an organic amide solvent and an alkali metal hydroxide. The organic amide solvent can be the same or different as the organic amide solvent that has been charged to the reactor 1. In addition, when the charge to the reactor 1 includes an alkali metal hydroxide (for instance when the alkali metal sulfide reactant is formed in situ prior to complex formation), the alkali metal hydroxide charged to the reactor 1 can be the same or different as the alkali metal hydroxide that is charged to the reactor 1.

The amounts of the organic amide solvent and the alkali metal hydroxide provided in the solution charged to the scrubber 18 can vary depending upon the specific reaction conditions of the process. In general, however, the amount of the organic amide solvent and the alkali metal hydroxide charged to the scrubber can be such that the molar ratio of the alkali metal hydroxide to the sulfur is conserved at a pre-determined value when the sulfur-containing scrubber mixture is returned to the reactor 1. For instance, the amount of the alkali metal hydroxide charged to the scrubber 18 can be from about 0.1 mole % with respect to the to the sulfur charged to the reactor 1 to about 5 mole % with respect to the sulfur charged to the reactor, or from about 1 mole % with respect to the sulfur charged to the reactor to about mole 3% with respect to the sulfur charged to the reactor. The moles of the organic amide solvent charged to the scrubber 18 per mole of sulfur charged to the reactor can be from about 0.1 moles solvent per mole of sulfur charged to about 3 moles solvent per mole of sulfur charged, or from about 1 mole solvent per mole of sulfur charged to about 2 moles solvent per mole of sulfur charged in one embodiment.

The sulfur-containing mixture that is returned to the reactor 1 from the scrubber 18 can include organic amide solvent and alkali metal hydroxide in conjunction with the hydrogen sulfide that has been removed from the stream 10. Beneficially, all of the components returned to the reactor 1 from the scrubber 18 can be utilized in the polyarylene sulfide formation process. Thus, the recovery system need not carry any components into the reactor that may prove detrimental to the formation of the polyarylene sulfide.

The scrubber 18 can also include a vent 20 and related valve 22, off of the top of the scrubber as shown, to allow flow and initial charging of the system.

The other components of the recovery system can separate other components of the stream 10, optionally for recycle back into the polymer formation process. For instance, a distillation column 12 can be utilized to separate the bulk of the organic amide solvent from the water and hydrogen sulfide of the stream 10. The organic amide solvent pulled off of the bottom of the distillation column can be returned to the reactor 1.

Water contained in the stream 10 can be condensed, for instance at a condenser 14 and separated from the hydrogen sulfide of the stream 10 at the condenser itself or optionally at a separate collection vessel 16. Following separation of the organic amide solvent and the water, the hydrogen sulfide can be captured at the scrubber 18, as described above.

During use, the recovery system can operate in a batch or a continuous recovery process. For instance, Reactor 1 can be initially charged with the organic amide solvent, the alkali metal sulfide (or optionally an alkali metal hydrogen sulfide and an alkali metal hydroxide) and water. In addition, scrubber 18 can be initially charged with organic amide solvent and alkali metal hydroxide that can be the same or different as those charged to the reactor.

The reactor 1 can be heated to encourage formation of the complex. The reactor utilized in the first stage can be stainless steel, though improved corrosion can be obtained by use of other materials such as a nickel-based alloy or titanium. The components in the reactor can be subjected to heating until the temperature of the mixture has reached about 200° C. to about 210° C. The complex formation reaction is an exothermic reaction, and suitable temperature control mechanisms can be utilized to maintain desired reaction conditions, as needed. The reaction can be carried out batch-wise or continuously.

During the formation of the complex, valves 21, 22, and 23 can remain open and valves 24 and 25 can be closed. This allows the fluid stream pulled off of the reactor 1 at 10 to pass through the distillation column 12, which can be held at a temperature such that the organic amide solvent can be the primary condensate. The remaining stream can then pass on to the condenser 14, where water can be primarily condensed. The organic amide solvent condensed at the distillation column 12 can be recycled back into the reactor 1, and the liquid condensate from the condenser 14 can be collected in collection vessel 16. The hydrogen sulfide of the stream 10 can thus pass through the distillation column 12, the condenser 14, and the collection vessel 16 to the scrubber 18, where it can be trapped in the scrubbing solution.

After the reactor 1 reaches the desired complex formation reaction temperature, the open valves of the recovery system 21, 22, and 23 can be closed, isolating the scrubber 18 from the reactor 1. The scrubber 18 can then be pressurized, for instance by use of an external nitrogen source (not shown in FIG. 1) followed by the opening of the valve 25 to discharge the sulfur-containing scrubbing mixture into the reactor 1.

The capture and return of the hydrogen sulfide to the reactor 1 can affect the equilibrium of the thermal decomposition reaction of the alkali metal sulfide, which can provide for a significant reduction in sulfur loss from the polymer formation process due to the thermal decomposition.

The sulfur-containing complex formed in the first reactor 1 can be utilized in a second stage during which the complex is reacted with dihaloaromatic monomer and a solvent to form the polyarylene sulfide prepolymer.

Figure 2:
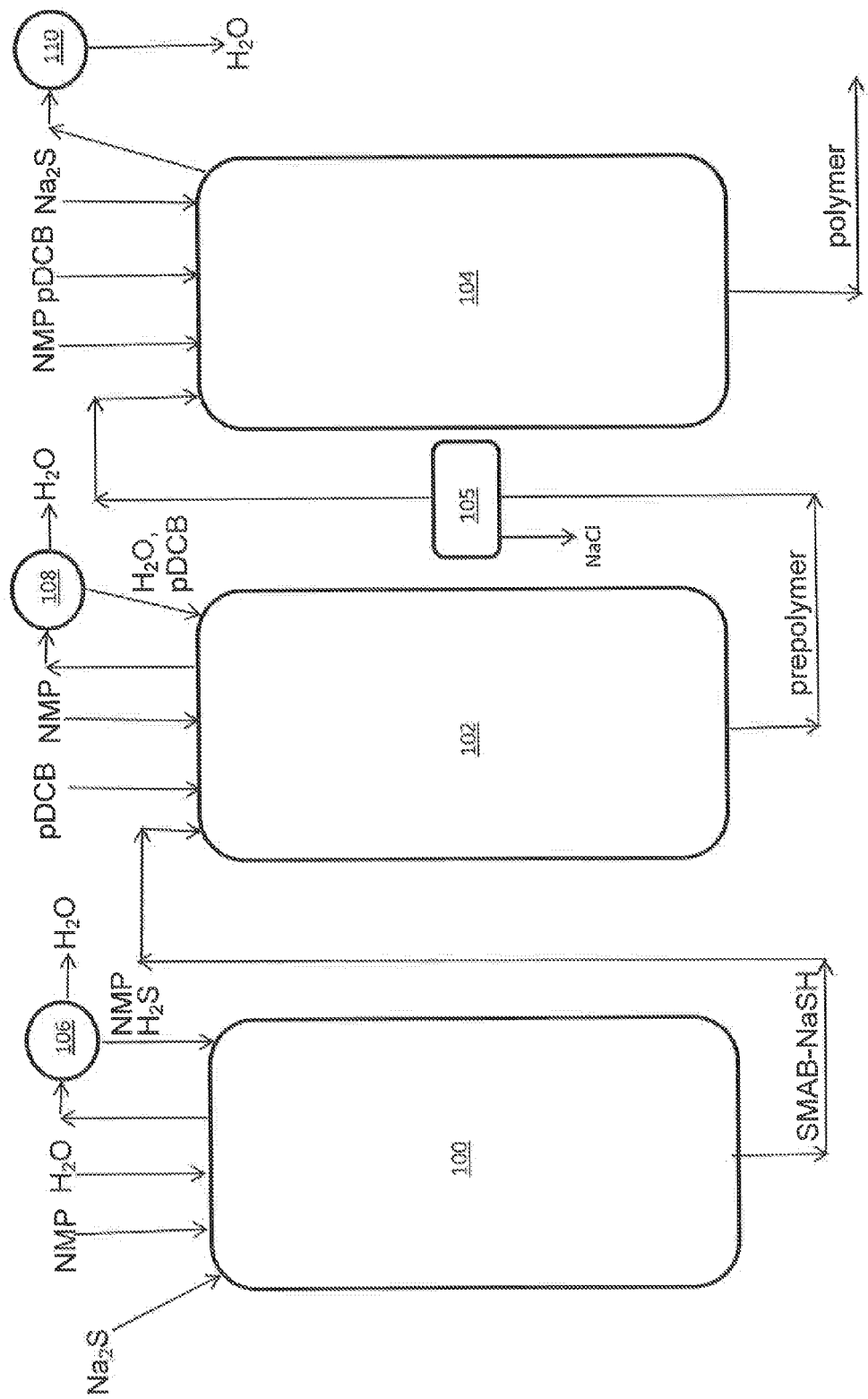
FIG. 2 illustrates one embodiment of a polyarylene sulfide formation process as described herein.

FIG. 2 illustrates one embodiment of the polymer formation process. In this embodiment, the sulfur-containing complex can be formed in a first reactor 100. For example, the charge to the reactor 100 can include sodium sulfide, NMP and water, as shown for formation of a SMAB-NaSH complex. The recovery process 106 can be similar to that described above in FIG. 1 so as to recover and return hydrogen sulfide and NMP to the reactor.

The SMAB-NaSH complex formed in the first reactor 100 can be charged to a second reactor 102 in conjunction with a dihaloaromatic monomer. The dihaloaromatic monomer can be, without limitation, a dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic monomers may be used either singly or in any combination thereof. Specific exemplary dihaloaromatic monomers can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom of the dihaloaromatic monomer can be fluorine, chlorine, bromine or iodine, and two halogen atoms in the same dihaloaromatic monomer may be the same or different from each other. In one embodiment, o-dichlorobenzene, m-dichlorobenzene, p-dichlorobenzene or a mixture of 2 or more monomers thereof is used as the dihaloaromatic monomer.

The polyarylene sulfide may be a homopolymer or may be a copolymer. By a suitable, selective combination of dihaloaromatic monomers, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

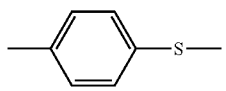

(II)

and segments having the structure of formula (III):

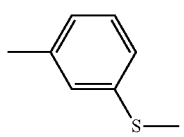

(III)

or segments having the structure of formula (IV):

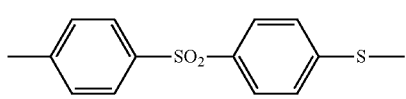

(IV)

In another embodiment, a copolymer can be formed and a monomer can be charged to the system having the formula (V)

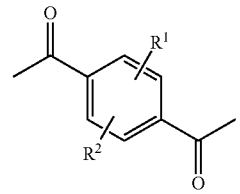

(V)

where the radicals $R^1$ and $R^2$, independently of one another, are a hydrogen, fluorine, chlorine or bromine atom or a branched or unbranched alkyl or alkoxy radical having from 1 to 6 carbon atoms. In one embodiment, a monomer of formula (V) can be p-hydroxybenzoic acid or one of its derivatives Another monomer as may be charged to the system can have a structure of the formula (VI):

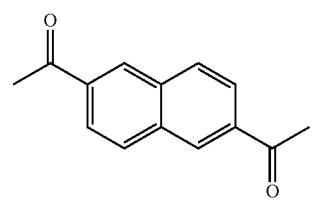

(VI)

One example of a monomer of formula (VI) is 2-hydroxynaphthalene-6-carboxylic acid. Monomers of the formula V and VI may be both charged to the system to form a polyarylene sulfide copolymer.

A polyarylene sulfide copolymer can include a segment derived from a polyarylene sulfide structure of the formula (VII):

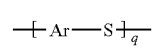

(VII)

where Ar is an aromatic radical, or more than one condensed aromatic radical, and q is a number from 2 to 100, in particular from 5 to 20. The radical Ar in formula (VII) may be a phenylene or naphthylene radical. In one embodiment, the second segment may be derived from poly(m-thiophenylene), from poly(o-thiophenylene), or from poly(p-thiophenylene).

The polyarylene sulfide may be linear, semi-linear, branched or crosslinked. A linear polyarylene sulfide includes as the main constituting unit the repeating unit of -(Ar-S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be formed that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups.

By way of example, monomer components used in forming a semi-linear polyarylene sulfide can include an amount of polyhaloaromatic monomers having 2 or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic monomers having more than two halogens substituted per molecule that can be employed in forming a semi-linear starting polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

In the illustrated embodiment of FIG. 2, the dihaloaromatic monomer can include p-dichlorobenzene (pDCB), as shown. In general, the amount of the dihaloaromatic monomer(s) per mole of the effective amount of the charged alkali metal sulfide in the prepolymer formation stage can generally be from about 1.0 to about 2.0 moles, from about 1.05 to about 2.0 moles, or from about 1.1 to about 1.7 moles. Thus, the polyarylene sulfide prepolymer can include alkyl halide (generally alkyl chloride) end groups.

The dihaloaromatic monomer can be charged into the second reactor 102 with a relatively low molar ratio of the dihaloaromatic monomer to the alkali metal hydrogen sulfide of the complex. For instance, the molar ratio of the dihaloaromatic monomer to sulfur charged to the second reactor can be from about 0.8 to about 1.5 or from about 1.0 to about 1.2.

The ratio of solvent to sulfur in the second stage can also be relatively low. For instance, the molar ratio of the alkali metal hydrogen sulfide of the complex to the organic amide solvent in the second stage (including the solvent added to the second reactor 102 and solvent remaining in the complex solution from the first reactor 100) can be from about 2 to about 2.5. This relatively low ratio can increase the concentration of reactants in the second reactor 102, which can increase the relative polymerization rate and the per volume polymer production rate.

The second stage reaction can be carried out under an inert atmosphere, such as nitrogen, and at increased pressure. For instance, the pressure in the second reactor 102 during the second stage can be from about 500 kPa to about to about 1600 kPa, from about 600 kPa to about 1500 kPa, or from about 700 kPa to about 1400 kPa.

The second reactor 102 can include a vapor outlet for removal of vapor during the second stage in order to maintain the desired pressure level. For instance, the second reactor can include a pressure relief valve as is known in the art. Vapor removed from the second stage can be condensed and separated as at separator 108, for instance to recover unreacted monomer for return to the reactor 102. A portion of the water of the vapor can be removed to maintain the conditions of the second stage, and a portion of the water can be returned to the second reactor. A small amount of water in the second reactor can generate reflux in the top of the reactor 102, which can improve separation between the water phase and the organic solvent phase in the reactor. This can in turn minimize loss of the organic solvent in the vapor phase removed from the reactor 102.

This vapor stream can optionally also be scrubbed with a scrubbing mixture as described herein in order to recover any hydrogen sulfide generated in the second reactor 102 during the polymerization process. In this embodiment, the reactor system can include a scrubbing system as described above in fluid communication with the vapor outlet and the second reactor so as to scrub the hydrogen sulfide from the fluid stream and return the hydrogen sulfide to the second reactor 102.

The polymerization reaction that forms the prepolymer in the reactor 102 can generally be carried out at a temperature of from about 180° C. to about 260° C., or from about 200° C. to about 250° C. Polymerization can continue until the conversion rate of the dihaloaromatic compound attains to not less than about 50 mol % of the theoretically necessary amount. The duration of this polymerization can be, e.g., from about 0.5 to about 15 hours, or from about 1 to about 5 hours.

The termination of the prepolymer formation reaction is generally that point at which the conversion rate of the dihaloaromatic monomer in the second reactor 102 reaches not less than about 50 mol %, not less than about 70 mol %, or not less than about 90 mol % of the theoretical conversion. The theoretical conversion of the dihaloaromatic monomer can be calculated from one of the following formulas:

(a) In the case wherein the dihaloaromatic monomer has been added in excess (by molar ratio) of the alkali metal sulfide:

$$\text{Conversion rate} = \frac{X-Y}{X-Z} \times 100$$

(b) In the cases other than (a):

$$\text{Conversion rate} = \frac{X-Y}{X} \times 100$$

wherein X is the amount of the charged dihaloaromatic monomer; Y is the remaining amount of the dihaloaromatic monomer and Z is the excessive amount of dihaloaromatic monomer in moles.

(c) In the case other than (a) or (b)

Conversion rate=$A/B*100$

Wherein A is the total weight of salt collected after removal of the residual polymer and other species other than salt by-product; B is the theoretical weight of salt which is two times the molar amount of the effective sulfide present during the polymerization.

Following the second stage polymerization reaction, the mean molar mass of the prepolymer as expressed by the weight average molecular weight, $M_w$, can be from about 500 g/mol to about 30,000 g/mol, from about 1000 g/mol to about 20,000 g/mol, or from about 2000 g/mol to about 15,000 g/mol.

The polymerization reaction apparatus for use in the second stage is not especially limited, although it is typically desired to employ an apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The second reactor 102 can be stainless steel, though improved corrosion can be obtained by use of other materials such as a nickel-based alloy or titanium.

Following the second stage polymerization reaction, the product solution that exits second stage reactor 102 can include the prepolymer, the solvent, and one or more salts that are formed as a by-product of the polymerization reaction. For example, the proportion by volume of the prepolymer solution exiting the second stage reactor 102 of salt that is formed as a byproduct to the reaction can be from about 0.05 to about 0.25, or from about 0.1 to about 0.2.

Salts included in the reaction mixture can include those formed as a byproduct during the reaction as well as other salts added to the reaction mixture, for instance as a reaction promoter. The salts can be organic or inorganic, i.e. can consist of any combination of organic or inorganic cations with organic or inorganic anions. They can be at least partially insoluble in the reaction medium and have a density different from that of the liquid reaction mixture.

According to one embodiment, at least a portion of the salts in the prepolymer mixture that exits the second stage reactor 102 can be removed from the mixture at a separation unit 105 prior to the third stage polymerization in third stage reactor 104. Removal of salts prior to final polymerization can simplify final polymer separation processes as well as increase the reaction rate of the third stage polymerization as a lower sulfur to solvent ratio may be used in the third stage, effectively increasing the polymer concentration and formation rate. In addition, by carrying out a salt separation process prior to the final polymerization reaction, the capacity of the third reactor for the reactants can be increased.

The separation method utilized at separation unit 105 to remove salts from the prepolymer solution is not particularly limited. For instance, the salts can be removed by use of screens or sieves as has been utilized in traditional separation processes. A salt/liquid extraction process can alternatively or additionally be utilized in separating the salt from the prepolymer solution. In one embodiment, a hot filtration process can be utilized in which the solution can be filtered at a temperature at which the prepolymer is in solution and the salts are in the solid phase.

According to one embodiment, a salt separation process can remove about 95% or more of the salts including in the prepolymer solution that exits the second reactor 102. For instance greater than about 99% of the salts can be removed from the prepolymer solution.

Following the prepolymer polymerization reaction in the second stage of the process and the filtration process, a third stage of the formation can take place during which the molecular weight of the prepolymer is increased in a third reactor 104. Input to the third reactor 104 can include the prepolymer solution from the filtration process 105 in addition to solvent, one or more dihaloaromatic monomers, and a sulfur-containing monomer. In the illustrated embodiment, the sulfur-containing monomer is sodium sulfide, but this is not a requirement of the third stage, and other sulfur containing monomers, such as an alkali metal hydrogen sulfide monomer may alternatively be utilized.

The dihaloaromatic monomers added to the third stage can be the same or different as the dihaloaromatic monomers added in the second stage. For example, it is possible to include a monohalo monomer (not necessarily an aromatic compound) in one or both of the second or the third stage in order to form end groups of the polyarylene sulfide or to regulate the polymerization reaction and/or the molecular weight of the polyarylene sulfide.

In one embodiment, the third reaction conditions can be nearly anhydrous, with the ratio of water to the sulfur-containing monomer less than about 0.2, for instance between 0 and about 0.2. The low water content during the third stage of the process can increase the polymerization rate and the polymer yield as well as reduce formation of undesired side reaction by-products as the conditions are favorable for nucleophilic aromatic substitution. Moreover, as pressure increases in the third stage are generally due to water vaporization, low water content during this stage can allow this polymerization reaction to be carried out at a constant, relatively low pressure, for instance less than about 1500 kPa. As such, the third reactor 104 need not be a high pressure reactor.

Near-anhydrous conditions in this stage are not a requirement, however, and in one embodiment, higher water content can be utilized in the third stage. For example, the ratio of water to the sulfur-containing monomer in the third reactor 104 can be greater than about 0.2, greater than about 1, or greater than about 2. For instance, the ratio of water to the sulfur-containing monomer in the third reactor can be from about 2 to about 4, or from about 2.5 to about 3, in one embodiment.

The third reactor 104 can include a vapor outlet for removal of vapor during the third stage in order to maintain low pressure in the reactor. For instance, the third reactor can include a pressure relief valve as is known in the art. Water vapor removed from the third stage can be condensed according to known processes, in one embodiment.

The reaction mixture of the third stage can be heated to a temperature of from about 120° C. to about 280° C., or from about 200° C. to about 250° C. and the polymerization can continue until the melt viscosity of the polymer is raised to the desired final level. The duration of this polymerization step can be, e.g., from about 0.5 to about 20 hours, or from about 1 to about 10 hours.

The polymerization reaction apparatus for use in the third stage is not especially limited, and can be the same or different as the reaction apparatus utilized in the second stage, e.g., a reaction apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The third reactor 104 can be stainless steel, though improved corrosion can be obtained by use of other materials such as a nickel-based alloy or titanium.

Following the third stage, and any desired post-formation processing, the polyarylene sulfide may be discharged from the third reactor 104, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

Figure 3:
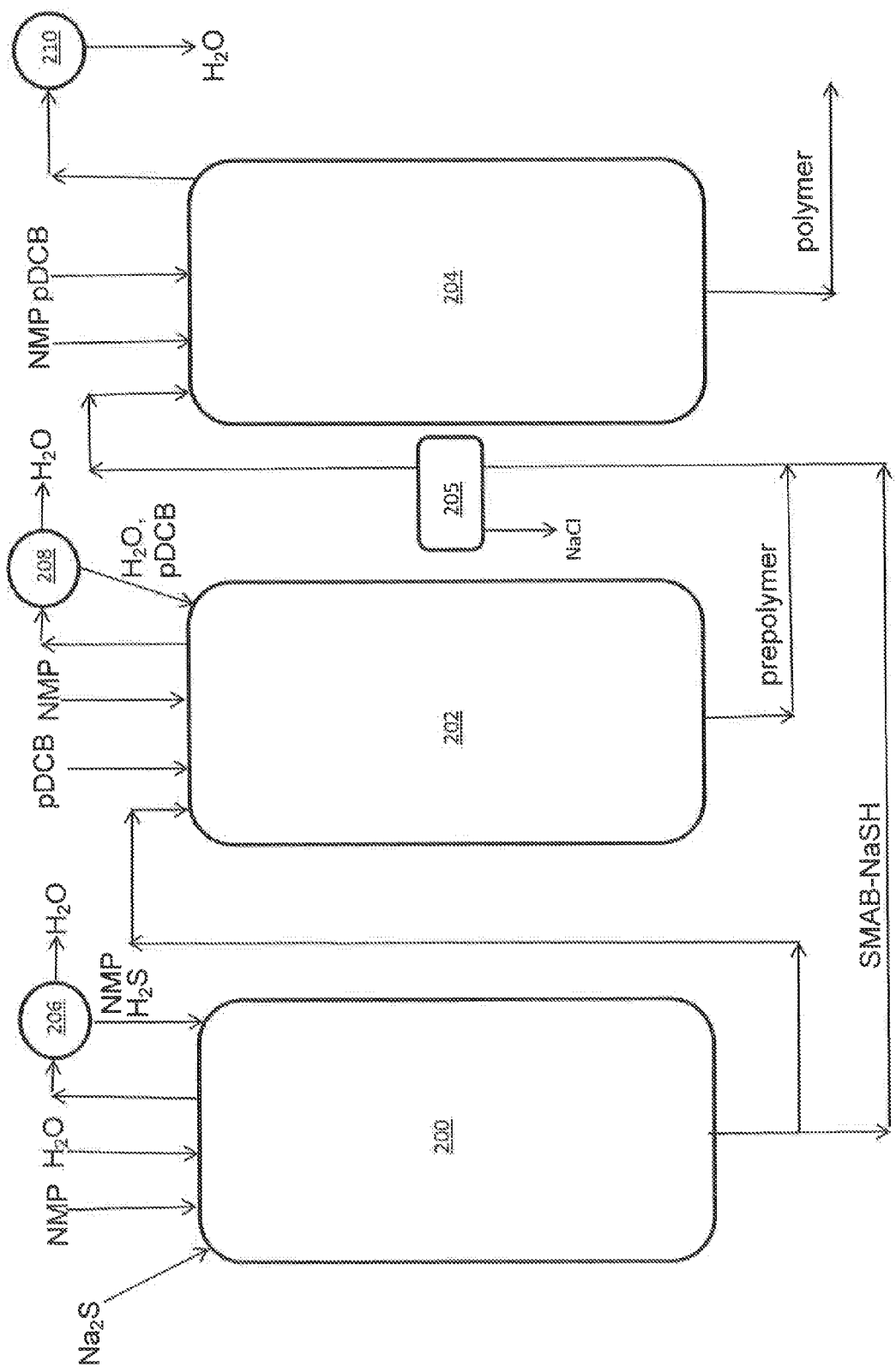
FIG. 3 illustrates another embodiment of a polyarylene sulfide formation process as described herein.

FIG. 3 illustrates another embodiment of the multi-stage polyarylene sulfide formation process. As can be seen, this process is similar to the multi-stage process of FIG. 2 and includes a first reactor 200, a second reactor 202 and a third reactor 204. The feed to the first reactor can include a sulfur-containing monomer, such as an alkali metal sulfide (e.g., $Na_2S$), an organic amide solvent (e.g., NMP), and water. The reactor 200 can include a vapor treatment stream including a distillation column and a scrubber for recovery of NMP and hydrogen sulfide similar to that of FIG. 1. The monomer complex (e.g., SMAB-NaSH) formed in the first reactor 200 can be fed to the second reactor in conjunction with a dihaloaromatic monomer (pDCB) and solvent (NMP) to form a prepolymer. As shown, the second reactor can include a vapor treatment stream including a condenser 208 similar to that of FIG. 2. The prepolymer solution that exits the second reactor 202 can be subjected to salt separation as at separation unit 205 before entering the third reactor 204, as discussed above.

As illustrated in FIG. 3, according to this embodiment, the sulfur-containing monomer fed to the third reactor 204 can include a portion of the complex including the hydrolysis product of the solvent and an alkali metal hydrosulfide that was formed in the first stage of the process at the first reactor 200. Utilization of the complex formed in the first stage of the process in both the second and third polymerization stages of the process can improve overall efficiency of the process and decrease costs of the process. The complex formed in the first stage can be fed to the third reactor 204 at a low fraction of the sulfide reactant and in conjunction with a dihaloaromatic monomer and additional solvent and the molecular weight of the prepolymer formed in the second stage can be increased as desired. As shown, the third reactor 204 can include a vapor treatment stream including a condenser 210 and water can be removed from the third reactor, as desired.

Following the third stage polymerization reaction, post treatment as is generally known in the art can be carried out to purify or otherwise improve the characteristics of the polyarylene sulfide formed by the process. For example, a second filtration process can be carried out that can remove any additional salt from the product mixture, for instance any salt formed as the molecular weight of the prepolymer is increased during the third stage polymerization. In one embodiment, the polyarylene sulfide can be subjected to a crystallization process.

Following formation, the polyarylene sulfide may be washed with liquid media. For instance, the polyarylene sulfide may be washed with water, acetone, N-methyl-2-pyrrolidone, a salt solution, and/or an acidic media such as acetic acid or hydrochloric acid. The polyarylene sulfide can be washed in a sequential manner that is generally known to persons skilled in the art. The polyarylene sulfide can be subjected to a hot water washing process. The temperature of a hot water wash can be at or above about 100° C., for instance higher than about 120° C., higher than about 150° C., or higher than about 170° C. Generally, distilled water or deionized water can be used for hot water washing. In one embodiment, a hot water wash can be conducted by adding a predetermined amount of the polyarylene sulfide to a predetermined amount of water and heating the mixture under stirring in a pressure vessel. By way of example, a bath ratio of up to about 200 grams of polyarylene sulfide per liter of water can be used. Following the hot water wash, the polyarylene sulfide can be washed several times with warm water, maintained at a temperature of from about 10° C. to about 100° C. A wash can be carried out in an inert atmosphere to avoid deterioration of the polymer.

In one embodiment, organic solvent washing can be combined with hot water washing and/or warm water washing. When a high-boiling-point organic solvent such as N-methylpyrrolidone is used, the residual organic solvent can be removed by washing with water or warm water after the organic solvent washing, and distilled water or deionized water can be used for this washing.

A polyarylene sulfide formed according to the multi-stage process can exhibit beneficial characteristics. For instance, the bulk density of the polymer can generally be between about 0.2 grams per cubic centimeter and about 1.5 grams per cubic centimeter, for instance between about 0.3 grams per cubic centimeter and about 1 gram per cubic centimeter as determined according to ISO Test No. 1183 (technically equivalent to ASTM D792). The volatile content of the polymer can be about 0.5 wt. % or less, for instance about 0.2 wt. % or less, based upon weight loss following vacuum drying.

The crystallization temperature, $T_{c2}$ can be between about 190° C. and about 300° C., for example between about 200° C. and about 265° C., as determined by differential scanning calorimetry, for instance as described in ISO Standard 10350. The pH of the formed polymer can generally be between about 3 and about 12. The polyarylene sulfide can also have a good appearance. For instance, the polyarylene sulfide can have a yellowness index of less than about 18.5 as determined according to ASTM e313.

The process can form a polyarylene sulfide with a good particle size distribution. For instance, the $d_{10}$ value can be from about 15 micrometers to about 30 micrometers, the $d_{50}$ value can be from about 70 micrometers to about 100 micrometers, and the $d_{90}$ value can be from about 100 micrometers to about 150 micrometers. The median diameter of the particles can be from about 100 micrometers to about 1000 micrometers. In one embodiment, about 95% or more of the particles can be between about 50 micrometers and about 150 micrometers in particle size. For instance, about 0.5 wt. % or less of the particles can have a diameter of greater than about 2800 micrometers, and about 10 wt. % or less of the polymers can have a diameter of less than about 110 micrometers.

The polyarylene sulfide can be utilized in forming products as are generally known in the art. For instance, the polyarylene sulfide can be combined with additives such as one or more of fillers (e.g., fibers and/or particulate fillers), coupling agents, an impact modifier, antimicrobials, pigments, lubricants, antioxidants, stabilizers, surfactants, waxes, flow promoters, solid solvents, and other materials added to enhance properties and processability. Such optional materials may be employed in a thermoplastic composition of the polyarylene sulfide in conventional amounts.

A mixture that is melt processed to form a melt processed thermoplastic composition may include a polyarylene sulfide (or a blend of multiple polyarylene sulfides) in an amount from about 40 wt. % to about 90 wt. % by weight of the mixture, for instance from about 45% wt. % to about 80 wt. % by weight of the mixture.

A thermoplastic composition including the polyarylene sulfide may be melt processed according to techniques known in the art. For example, the thermoplastic composition may be melt-kneaded in conjunction with one or more additives in a single-screw or multi-screw extruder at a temperature of from about 250° C. to about 320° C. In one embodiment, the composition may be melt processed in an extruder that includes multiple temperature zones. For instance, the composition may be melt processed in an extruder that includes a temperature zone that is maintained at a temperature of between about 250° C. and about 320° C.

Conventional shaping processes for forming articles including the polyarylene sulfide may be used. For instance, extrusion, injection molding, blow-molding, thermoforming, foaming, compression molding, hot-stamping, fiber spinning and so forth can be used.

Shaped articles that may be formed including the polyarylene sulfide may include structural and non-structural shaped parts, for instance for appliances, electrical materials, electronic products, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, and pond liners, to name a few. Other useful articles besides moldings, extrusion and fibers include wall panels, overhead storage lockers, serving trays, seat backs, cabin partitions, window covers, and electronic packaging handling systems such as integrated circuit trays.

A composition including the polyarylene sulfide can be used in a variety of electrical and electronic applications such as, for example, connectors and over-molding (insert-molding) parts is encompassed.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

EXAMPLE

A reactor system as illustrated in FIG. 1 was utilized to form a SMAB-NaSH complex. Specifically, the reactor system included a 2 liter Parr titanium reactor equipped with an addition funnel, a scrubber, and a distillation apparatus.

In a first run, the reactor was charged with 62.08 g of NaOH (96.19%, 1.49 moles), 319.75 g N-methylpyrrolidinone (NMP) and 22.12 g H2O. In this run, the scrubber vessel was kept empty. The reactor was sealed and purged with a slow stream of nitrogen gas. The mixture was stirred and the temperature raised to 100° C. Molten NaSH containing $Na_2S$ (1.5 mol S) was added by means of the heated addition funnel. The temperature was raised to 202° C. while a stream of distillate was continually collected. After the dehydration stage it was found that the $H_2O$:S ratio was 1.5, and the NMP:S ratio was 2.5. $H_2S$ lost during dehydration was found to 0.76 mole percent with respect to initial sulfide charged. This SMAB-NaSH mixture was transferred to an addition funnel while molten and allowed to cool.

In a second run, the reactor was charged with 103.51 g of NaOH (96.19%, 2.49 moles), 367.56 g N-methylpyrrolidinone (NMP) and 36.82 g $H_2O$. In this run, the scrubber vessel was charged with 200 g NMP. The reactor was sealed and purged with a slow stream of nitrogen gas. The mixture was stirred and the temperature raised to 100° C. Molten NaSH containing $Na_2S$ (2.5 mol S) was added by means of the heated addition funnel. The temperature was raised to 202° C. while a stream of distillate was continually collected. After the dehydration stage it was found that the H2O:S ratio was 1.5, and the NMP:S ratio was 2.5. $H_2S$ lost during dehydration was found to 0.51 mole percent with respect to initial sulfide charged. This SMAB-NaSH mixture was transferred to an addition funnel while molten and allowed to cool.

In a third run, the reactor was charged with 102.18 g of NaOH (96.47%, 2.46 moles), 367.56 g N-methylpyrrolidinone (NMP) and 36.82 g $H_2O$. In this run, the scrubber vessel was charged with 250 g NMP and 1.6 g of 50% NaOH (0.08 mole % with respect to sulfur charged). The reactor was sealed and purged with a slow stream of nitrogen gas. The mixture was stirred and the temperature raised to 100° C. Molten NaSH containing $Na_2S$ (2.5 mol S) was added by means of the heated addition funnel. The temperature was raised to 202° C. while a stream of distillate was continually collected. After the dehydration stage it was found that the H2O:S ratio was 1.5, and the NMP:S ratio was 2.5. $H_2S$ lost during dehydration was found to 0.24 mole percent with respect to initial sulfide charged. This SMAB-NaSH mixture was transferred to an addition funnel while molten and allowed to cool.

Results of the three runs are summarized in the following table:

| Batch Run | Conditions in Vessel H | Final NaOH/S | Mole % S lost |
|---|---|---|---|
| 1 | 0 g NMP, 0 g 50% NaOH | 1.01 | 0.76 |
| 2 | 200 g NMP, 0 g 50% NaOH | 1.01 | 0.51 |
| 3 | 250 g NMP, 1.6 g 50% NaOH | 1.01 | 0.24 |

Clearly, the scrubbing solution that included an organic amide solvent in conjunction with an alkali metal hydroxide was able to recover lost sulfur and prevent sulfur loss from the formation process.

While certain representative embodiments and details have been shown for the purpose of illustrating the subject invention, it will be apparent to those skilled in this art that various changes and modifications may be made therein without departing from the scope of the subject invention.

What is claimed is:

1. A method for forming a polyarylene sulfide comprising:
   reacting an organic amide solvent, alkali metal sulfide, and water to form a reaction mixture that includes a hydrogen sulfide-byproduct and a complex of an alkali metal organic amine carboxylic acid salt and an alkali metal hydrosulfide;
   separating a fluid stream from the reaction mixture that includes the hydrogen sulfide by-product and contacting the fluid stream with a scrubbing mixture to form a sulfur-containing mixture, the scrubbing mixture including an organic amide solvent and an alkali metal hydroxide;
   charging the sulfur-containing mixture to the reactor;
   carrying out a first polymerization reaction during which the complex is reacted with a dihaloaromatic monomer to form a polyarylene sulfide prepolymer; and
   carrying out a second polymerization reaction during which the polyarylene sulfide prepolymer is reacted with a dihaloaromatic monomer and a sulfur-containing monomer to form the polyarylene sulfide.

2. The method of claim 1, wherein the alkali metal sulfide is sodium sulfide.

3. The method of claim 1, wherein the alkali metal hydroxide is sodium hydroxide.

4. The method of claim 1, wherein the alkali metal sulfide is generated in the reactor via reaction of an alkali metal hydrogen sulfide and an alkali metal hydroxide.

5. The method of claim 1, wherein the complex includes sodium methylaminobutyrate and sodium hydrosulfide.

6. The method of claim 1, wherein the reaction forming the polyarylene sulfide prepolymer also forms a salt, the method further comprising separating the salt from the prepolymer.

7. The method of claim 1, further comprising purifying the polyarylene sulfide.

8. The method of claim 1, further comprising combining the polyarylene sulfide with one or more additives.

9. The method of claim 1, wherein the amount of the alkali metal hydroxide in the scrubbing mixture is from about 0.1 mole % to about 5 mole % with respect to the amount of the total moles of sulfur supplied to the reactor.

10. The method of claim 1, wherein the amount of the organic amide solvent in the scrubbing mixture is from about 0.1 mole % to about 3 mole % with respect to the amount of the total moles of sulfur supplied to the reactor.

11. The method of claim 1, wherein the organic amide solvent in the scrubbing mixture is N-methylpyrrolidone.

12. The method of claim 1, wherein the first polymerization reaction occurs in the presence of an organic amide solvent.

13. The method of claim 12, wherein the organic amide solvent used in the first polymerization reaction is N-methylpyrrolidone.

14. The method of claim 1, wherein the second polymerization reaction occurs in the presence of an organic amide solvent.

15. The method of claim 14, wherein the organic amide solvent used in the second polymerization reaction is N-methylpyrrolidone.

16. The method of claim 1, wherein the first polymerization reaction occurs in a second reactor.

17. The method of claim 16, wherein the second polymerization reaction occurs in a third reactor.

18. The method of claim 1, wherein the sulfur-containing monomer is sodium sulfide or sodium hydrogen sulfide.

19. The method of claim 1, wherein a first amount of the complex is reacted with the dihaloaromatic monomer during the first polymerization reaction and a second amount of the complex is reacted with the prepolymer and the dihaloaromatic monomer during the second polymerization reaction, wherein the sulfur-containing monomer comprises the second amount of the complex.

20. The method of claim 1, wherein the dihaloaromatic monomer in the first polymerization reaction, the second polymerization reaction, or both comprises dichlorobenzene.

21. The method of claim 1, wherein the first polymerization reaction forms a reaction mixture that includes the prepolymer and a hydrogen sulfide by-product.

22. The method of claim 21, further comprising:
separating a second fluid stream from the reaction mixture formed during the first polymerization reaction, wherein the second fluid stream includes the hydrogen sulfide by-product; and
contacting the second fluid stream with a scrubbing mixture to form a sulfur-containing mixture, the scrubbing mixture including an organic amide solvent and an alkali metal hydroxide.

23. The method of claim 1, wherein the organic amide solvent used to form the complex is N-methylpyrrolidone.

24. The method of claim 1, wherein the alkali metal sulfide used to form the complex is formed from the reaction of sodium hydrogen sulfide and sodium hydroxide.

25. The method of claim 1, wherein about 90% or more of the hydrogen sulfide by-product is removed from the fluid stream.

26. The method of claim 1, wherein the fluid stream also comprises water vapor and vaporous organic amide solvent.

* * * * *